Figure 1:
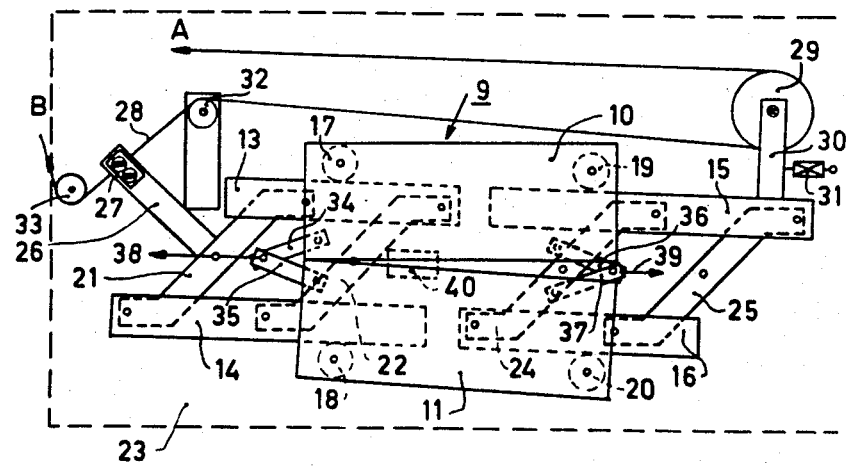

United States Patent [19]
Firth

[11] 3,860,328
[45] Jan. 14, 1975

[54] MEASURING ATTENUATOR FOR AN OPTICAL NULL SPECTROPHOTOMETER

[75] Inventor: John Richard Firth, Cambridge, England

[73] Assignee: Pye Limited, Cambridge, England

[22] Filed: July 6, 1973

[21] Appl. No.: 377,067

[30] Foreign Application Priority Data
July 12, 1972  Great Britain..................... 32516/72

[52] U.S. Cl.................. 350/271, 250/229, 250/512, 356/89
[51] Int. Cl............................ G02f 1/28, G01j 3/42
[58] Field of Search........ 356/88, 89; 350/266, 269, 350/270, 271, 272; 250/237, 229, 511, 512

[56] References Cited
UNITED STATES PATENTS
| | | | |
|---|---|---|---|
| 3,529,898 | 9/1970 | De Mey | 350/171 |
| 3,685,885 | 8/1972 | Scott | 356/89 |

*Primary Examiner*—Vincent P. McGraw
*Attorney, Agent, or Firm*—Frank R. Trifari; Simon L. Cohen

[57] ABSTRACT

An adjustable geometry measuring attenuator for an optical null spectrophotometer. The attenuator has two opaque plates mounted to provide a wedge shaped aperture which is movable across the reference radiation beam. At each end of the wedge the plates are mounted by rollers on a pair of parallel tracks whose spacing and hence the relative positions of the two plates can be adjusted by rotation of links connecting the tracks of each pair. This rotation is achieved by means of a string which is fixed relative to the pair of tracks at the narrow end of the wedge and passes over a pulley on the pair of tracks at the wide end of the wedge. A control knob on the instrument calibrated in terms of percentage "back-off" or the lower transmittance limit attached to the end of the string leading from the narrow end of the wedge and when this end of the string is moved the spacing of the plates is altered whilst keeping the wedge angle the same. Another control knob on the instrument calibrated in terms of scale expansion is attached to the end of the string leading from the wide end of the wedge and when this end of the string is moved the angle of the wedge is altered.

8 Claims, 2 Drawing Figures

MEASURING ATTENUATOR FOR AN OPTICAL NULL SPECTROPHOTOMETER

This invention relates to optical null spectrophotometers with particular reference to radiation beam intensity measuring attenuators used therein.

In one type of known optical null spectrophotometer the measuring attenuator has a wedge shaped aperture or a plurality of wedge shaped apertures and is driven across the reference beam during the measuring operation to change the area of the aperture or apertures in the region of the reference beam and hence the intensity of the reference beam. The attenuator is driven by a servo system to a position between lower and upper transmittance limits where the intensity of the reference beam equals that of the sample beam, and the attenuator may be mechanically coupled to the pen of a chart recorder.

A known refinement of this type of spectrophotometer is where an additional servo system is provided instead of a simple mechanical coupling between the measuring attenuator and the pen of the chart recorder. In this case the position of the measuring attenuator controls the position of the wiper of a potentiometer which in turn controls a servo motor, and expansion of any part of the scale of the recorder can be obtained by varying the fixed potential applied across the potentiometer. The provision of an additional servo system adds considerably to the complexity and cost of the spectrophotometer. An alternative and cheaper known method of obtaining simple scale expansion alone is to place a second attenuator in the reference beam whose aperture area can be varied. However the second attenuator does not provide the possibility of "back-off" within the instrument, that is to say the ability to change both the lower and upper transmittance limits of the measuring operation whilst keeping the same range between said limits.

The primary object of the present invention therefore is to provide a simple and inexpensive means for obtaining "back-off" within an optical null spectrophotometer.

Accordingly the invention provides a measuring attenuator for an optical null spectrophotometer, in which two opaque plates are mounted so as to provide a wedge shaped space therebetween, in which the two plates are movable together substantially along the axis of symmetry of the wedge to perform the measuring operation between lower and upper transmittance limits, and in which means are provided which enable the relative positions of the plates to be adjusted from a point remote from the attenuator so as to change both the lower and upper transmittance limits whilst keeping the same range between said limits.

The wedge shaped space can be substantially straight edged, in which case means may also be provided which enable the relative positions of the plates to be adjusted from another point remote from the attenuator so as to change the range between the lower and upper transmittance limits, that is to say that scale expansion can also be provided by adjustment of the geometry of the measuring attenuator.

In a preferred embodiment where both "back-off" and scale expansion are obtained by the adjustable geometry of the measuring attenuator, there is further provided according to the invention a radiation beam intensity measuring attenuator for an optical null spectrophotometer, in which two opaque plates each having a substantially straight edge are located so as to provide a wedge shaped space between said edges, in which the two plates are movable together between first and second limit positions substantially along the axis of symmetry of the wedge to perform the measuring operation, in which both plates are mounted on first adjustable mounting means which determine the separation of the plates at the position of the radiation beam when the plates are at said first limit position and hence the lower transmittance limit of the attenuator, in which both plates are also mounted on second adjustable mounting means which determine the separation of the plates at the position of the radiation beam when the plates are at said second limit position and hence the upper transmittance limit of the attenuator, and in which the first and second adjustable mounting means are interconnected so that they can be adjusted together from a point remote from the attenuator to change both the lower and upper transmittance limits whilst keeping the same range between said limits and so that the second mounting means can also be adjusted from another point remote from the attenuator to change the upper transmittance limit alone.

According to the invention there is also provided an optical null spectrophotometer including a measuring attenuator as defined in any one of the above three paragraphs.

Figure 2:
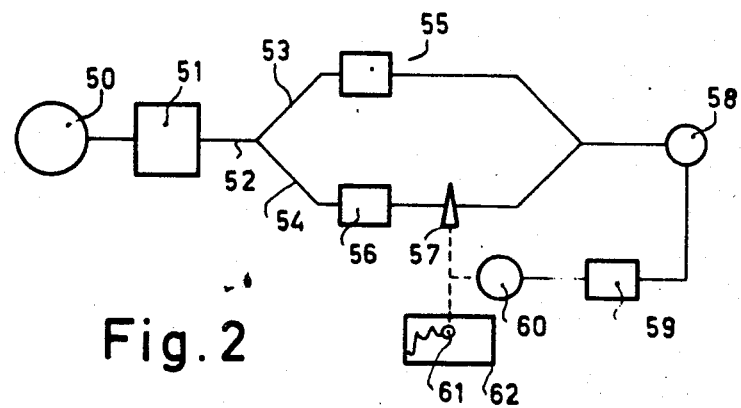

The invention will now be described in more detail with reference to the accompanaying drawings, in which FIG. 1 is a front elevation of an attenuator according to the invention, and FIG. 2 is a schematic diagram of an optical null spectrophotometer in which the attenuator of FIG. 1 can be used.

Referring now to FIG. 1, the attenuator 9 comprises two opaque plates 10 and 11 of sheet metal mounted upon two pairs of parallel tracks 13, 14 and 15, 16, by means of rollers 17, 18 and 19, 20 so as to provide a wedge shaped space between the two plates 10 and 11. The two pairs of parallel tracks are also parallel to each other. Tracks 13 and 14 are pivotally attached to links 21 and 22 which are themselves pivotally mounted about their centres upon a back-plate 23. Parallel tracks 15 and 16 are similarly arranged upon links 24 and 25

An arm 26 rigidly attached to the mid-point of link 21 has secured to it by means of screw plate 26, a string 28. String 28 also passes about pulley 29 mounted upon bracket 30 ridigly attached to track 15 and having coupled to it one end of a coil spring 31; the other end of spring 31 is secured to back-plate 23. String 28 also passes over intermediate pulleys 32 and 33.

Blades 10 and 11 of the attenuator element have attached to their outer ends pivotally mounted coupling pieces 34, 35 and 36, 37 respectively. The coupling pieces 34 and 35 are attached to a string 38 and coupling pieces 36 and 37 to a string 39 to enable the two plates 10 and 11 to be drawn together substantially along the axis of symmetry of the wedge across an aperture 40 in back-plate 23 through which a beam of incident radiation passes to perform a measuring operation.

The ratio of the intensities of radiation incident upon and emergent from the attenuator is referred to as the transmittance and is normally expressed as a percentage. With the attenuator totally obscuring the incident radiation the transmittance value is 0% (0%T) and with the incident beam unobstructed by the attenuator the transmittance value is 100% (100%T). In the measuring operation the two plates can be moved between first and second limit positions to the right and left of FIG. 1 respectively. The separation of the plates at the position of the radiation beam when the plates are at the first and second limit positions determine the lower and upper transmittance limits respectively of the attenuator.

The attenuator shown in FIG. 1 and described above allows the upper transmittance value of the attenuator to be adjusted either independently of the lower limit or concurrently by the same amount.

To modify the upper transmittance value of the attenuator 9 the end A of the string 28 is moved either with or against the force exerted by spring 31 thereby causing parallel tracks 15 and 16 to move either nearer together or further apart. Parallel movement of tracks 15 and 16 on links 24 and 25 causes the angle of the wedge between the plates 10 and 11 to increase or decrease altering the upper transmittance value. With end B of string 28 anchored there is no movement of parallel tracks 13 and 14, the plates 10 and 11 pivot about a point on the axis of symmetry of the wedge which is on the reference beam when the attenuator is at the above-mentioned first limit position and thus the lower transmittance value of the attenuator 9 remains the same.

To modify the upper and lower limits of transmittance value of the attenuator 9 concurrently the end B of string 28 is moved, again with or against the force exerted by spring 31, with end A anchored. Movement of parallel tracks 13 and 14 is thus obtained by means of arm 26 mounted upon link 21, and of parallel tracks 15 and 16 by means of arm 30 mounted upon track 15. By suitably dimensioning arm 26 the movement imparted to each end of attenuator element 9 is the same, that is to say the angle of the wedge is unchanged.

With the left-hand end of attenuator 9 set to a chosen transmittance value the opening at the right-hand end may be adjusted with end A of string 28 to vary the transmittance range of the attenuator. With a given range of transmittance value the upper and lower limits of transmittance may be modified by end B of string 28; the transmittance range of the attenuator remains the same but the transmittance limits are adjusted. The spring 31 tends to close both pairs of tracks and hence stabilises them at any position set by the string 28.

The ends A and B of string 28 are preferably wound upon drums linked with calibrated control spindles to enable ready adjustment of the attenuator by the user.

Referring now to FIG. 2, radiation from the source 50 into the adjustable monochromator 51 and the emergent beam 52 of monochromatic radiation passes alternately through a sample path 53 and a reference path 54 by means of a directing device not shown. The sample path 53 includes a sample cuvette 55 and the reference path 54 an identical cuvette 56 and a measuring attenuator 57.

Radiation falling alternately upon photoelectric detector 58 from the two paths gives rise to an output signal with an alternating component of magnitude dependent upon the relative intensities, and hence transmittances, of the sample and reference paths. The alternating signal is amplified by amplifier 59 and fed to servo motor 60 mechanically linked to measuring attenuator 57 and pen 61 of chart recorder 62. The system is such that any imbalance in the radiation intensities incident upon photoelectric detector 58 causes the servo motor 60 to drive measuring attenuator 57 into or out of path 54 to equate the transmittances of paths 53 and 54.

It will be apparent that any change of transmittance in the sample beam, for example that due to a sample substance introduced into cuvette 55, will be countered by a corresponding change of position by attenuator 57 giving a direct indication of sample transmittance. Pen 61 mechanically linked to attenuator 57 registers the corresponding movement upon chart recorder 62 and by synchronising the driving motor of the chart recorder with the scanning mechanism of monochromator 51 a plot of sample transmittance against wavelength is obtained.

By including an attenuator of the type described in relation to FIG. 1 in an optical null spectrophotometer such as that shown in FIG. 2 scale expansion and "back-off" are readily provided in the spectrophotometer by the simple and direct method of modifying the attenuator geometry.

Scale expansion is effected by adjusting the attenuator geometry such that the range of transmittance values is less than the maximum available range whilst employing the same range of travel of pen 61 on chart recorder 62. For example if the maximum transmittance range available is 0%T to 100%T and the attenuator is adjusted to give a transmittance range of 0%T to 50%T the scale expansion obtained is $x2$. Modification of the attenuator for this purpose is achieved by use of a control linked to the end A of string 28. The control may be calibrated in terms of the scale expansion factor.

To achieve "back-off" the minimum transmittance value of the attenuator is arranged to be greater than 0%T and is effected by alteration of a control linked to end B of string 28, opening both ends of attenuator element 9 by equal amounts. For example if the range of the attenuator is initially set to be 0%T to 50%T a "back-off" of 30%T changes the transmittance value limits of the attenuator to from 30%T to 80%T, i.e. the scale expansion remains the same. The control linked to end B of string 28 may be calibrated directly in terms of the lower transmittance limit value.

Another example of the flexibility which the adjustable geometry attenuator provides is as follows. With the scale expansion control set at "1", the "back-off" control could be set to a lower transmittance value of say 40%T. Thus the limits would be 40%T to 140%T (effectively 100%T). The scale expansion control could then be adjusted to say $x4$. The limits would then be 40%T to 65%T.

When an attenuator such as that shown in FIG. 1 is incorporated in an optical null spectrophotometer such as is shown in FIG. 2 the strings 38 and 39 attached to either end of attenuator element 9 will form part of a continuous loop driven by servo motor 60.

A possible modification of the measuring attenuator described above with reference to FIG. 1 is that the wedge shaped space need not necessarily be straight edged. For example, the edges could follow a logarithmic curve so that the attenuator would effectively measure absorbance rather than transmittance. In this case "back-off" could still be provided by moving the end B of the string with the end A anchored, but scale expansion would have to be provided elsewhere in the instrument, for example by placing a second attenuator in the reference beam whose aperture area can be varied.

What I claim is:

1. A measuring attenuator for an optical null spectrophotometer, in which two opaque plates are mounted so as to provide a wedge shaped space therebetween, in which the two plates are movable together substantially along the axis of symmetry of the wedge to perform the measuring operation between lower and upper transmittance limits, and in which means are provided which enable the relative positions of the plates to be adjusted from a point remote from the attenuator so as to change both the lower and upper transmittance limits whilst keeping the same range between said limits.

2. A measuring attenuator as claimed in claim 1, in which the wedge shaped space is substantially straight edged, and in which means are also provided which enable the relative positions of the plates to be adjusted from another point remote from the attenuator so as to change the range between the lower and upper transmittance limits.

3. A radiation beam intensity measuring attenuator for an optical null spectrophotometer, in which two opaque plates each having a substantially straight edge are located so as to provide a wedge shaped space between said edges, in which the two plates are movable together between first and second limit positions substantially along the axis of symmetry of the wedge to perform the measuring operation, in which both plates are mounted on first adjustable mounting means which determine the separation of the plates at the position of the radiation beam when the plates are at said first limit position and hence the lower transmittance limit of the attenuator, in which both plates are also mounted on second adjustable mounting means which determine the separation of the plates at the position of the radiation beam when the plates are at said second limit position and hence the upper transmittance limit of the attenuator, and in which the first and second adjustable mounting means are interconnected so that they can be adjusted together from a point remote from the attenuator to change both the lower and upper transmittance limits whilst keeping the same range between said limits and so that the second mounting means can also be adjusted from another point remote from the attenuator to change the upper transmittance limit alone.

4. A measuring attenuator as claimed in claim 3, in which the first and second mounting means each include a pair of parallel tracks, the two pairs of tracks being parallel and the two plates being movable together on the tracks between said first and second limit positions, in which the tracks of each pair are linked by means which are rotatable for changing the spacing between the tracks of that pair, and in which a string interconnects the first and second mounting means and extends at each end to a point remote from the attenuator, the interconnection being such that if one end of the string extending from the first mounting means is moved while the other end is anchored then the spacing between the tracks of both the first and second mounting means will be changed whereas if the said other end of the string extending from the second mounting means is moved while said one end is anchored then the spacing between the tracks of the second mounting means alone will be changed.

5. A measuring attenuator as claimed in claim 4, and in which the interconnecting string is fixed relative to the first mounting means and passes over a pulley on the second mounting means.

6. A measuring attenuator as claimed in claim 4, and in which spring means are fixed to the second mounting means which tend to close both pairs of tracks and hence stabilises them at any position set by said string.

7. A measuring attenuator as claimed in claim 4, in which said one end of the string is linked to a control calibrated in terms of the lower transmittance limit, and in which said other end of the string is linked to a control calibrated in terms of scale expansion factor.

8. A measuring attenuator as claimed in claim 4, in which at each end of the pair of plates both plates are attached by pivotally mounted coupling pieces to a driving string, and in which the two driving strings are included in a continuous loop of a servo system adapted to operate the measuring attenuator.

* * * * *